United States Patent [19]
Beroth

[11] Patent Number: 5,775,642
[45] Date of Patent: Jul. 7, 1998

[54] CONVERTIBLE PASSENGER SEAT ASSEMBLY

[75] Inventor: Michael T. Beroth, Lewisville, N.C.

[73] Assignee: BE Aerospace, Inc., Wellington, Fla.

[21] Appl. No.: 784,022

[22] Filed: Jan. 15, 1997

Related U.S. Application Data

[63] Continuation of Ser. No. 228,512, Apr. 15, 1994, Pat. No. 5,597,139.

[51] Int. Cl.$^6$ ..................... B64D 11/06
[52] U.S. Cl. ........... 244/118.6; 297/234; 297/248; 297/257; 244/122 R
[58] Field of Search ............ 244/118.5, 118.6, 244/122 R; 297/232, 233, 234, 235, 236, 237, 248, 257, 125; 296/69.1

[56] References Cited

U.S. PATENT DOCUMENTS

| | | | |
|---|---|---|---|
| 3,568,972 | 3/1971 | Sherman | 244/122 R |
| 4,881,702 | 11/1989 | Slettebak | 244/118.6 |
| 5,104,065 | 4/1992 | Daharsh et al. | 244/118.6 |
| 5,131,607 | 7/1992 | Arnold et al. | 244/118.6 |
| 5,178,345 | 1/1993 | Peltola et al. | 244/118.6 |
| 5,193,795 | 3/1993 | Simpson et al. | 244/118.5 |

FOREIGN PATENT DOCUMENTS

| | | | |
|---|---|---|---|
| 530900 | 3/1993 | European Pat. Off. | 244/118.6 |

*Primary Examiner*—Galen L. Barefoot
*Attorney, Agent, or Firm*—Adams Law Firm, P.A.

[57] ABSTRACT

A passenger seat assembly convertible between a two-seat configuration and a three-seat configuration, including a seat assembly base and first, second and third seats for carrying respective seat bottom and seat back cushions. The first and third seats defining outboard seats are moveable on the seat assembly base and the second seat defines a center seat carried in a fixed position on the seat assembly base. A gear drive is carried by the seat assembly base and interconnects the first and third seats for simultaneous movement relative to each other and to the second seat. The first and third seats move towards each other into the two-seat configuration wherein the first and third seats encroach upon the second seat and define a dead zone between the first and third seat. The first and third seats are moveable away from each other into the three-seat configuration wherein the second seat defines a center seat having the same seating width as the first and third seats. In an alternative embodiment, the gear drive connects only to the first seat, and the third seat is moved manually.

8 Claims, 7 Drawing Sheets

CONVERTIBLE PASSENGER SEAT ASSEMBLY

This application is a continuation of application Ser. No. 08/228,512, filed Apr. 15, 1994, now U.S. Pat. No. 5,597,139.

TECHNICAL FIELD AND BACKGROUND OF THE INVENTION

This invention relates to a passenger seat assembly, such as for use in a commercial aircraft, which is convertible between a three seat and a two seat configuration. This type of convertibility permits airlines to quickly chance the seat configuration to more closely match passenger mix and schedule changes. Changes in the airline industry have made quick turnaround time between flights of increasing importance. Because of financial losses, many airlines have cancelled or delayed new aircraft orders. Existing aircraft must be more quickly turned around between flights. In situations where seat configuration changes are needed, the ability to convert a seat between three and two seat configurations saves substantial time over replacement of an entire seat assembly, which generally requires the aircraft to be out of service at least overnight, and to be serviced by ground staff personnel.

Conventional aircraft seat assemblies are generally formed of two or more seats attached to a unifying frame which is in turn locked into a seating track in the floor of the aircraft. These seats are usually fixed onto the frame in such a way as to prevent adjustments to the width of the seat itself or to the spacing between adjacent seats on the assembly.

U.S. Pat. Nos. 5,178,345; 5,131,607; 5,104,065 and 4,881,702, all owned by the Boeing Company, disclose convertible seats, some of which alter the configuration of two-seat assemblies and three-seat assemblies, and others of which convert seat assemblies between two and three seats.

The convertible seat assembly disclosed in this application permits quick and simple conversion between two and three seats in a passenger seat by flight personnel between flights.

SUMMARY OF THE INVENTION

Therefore, it is an object of the invention to provide a passenger seat convertible between two and three seats.

It is another object of the invention to provide a passenger seat which permits quick conversion of economy seats to business-class seats.

It is another object of the invention to provide a passenger seat which is convertible between two and three seats from one side of the seat.

It is another object of the invention to provide a passenger seat which permits expansion and compression of the passenger seat assembly at different rates to provide differing changes in various dimensions during a single movement.

These and other objects of the present invention are achieved in the preferred embodiments disclosed below by providing a passenger seat assembly convertible between a two-seat configuration and a three-seat configuration, including a seat assembly base and first, second and third seats for carrying respective seat bottom and seat back cushions. The first and third seats defining outboard seats are moveable on the seat assembly base and the second seat defines a center seat carried in a fixed position on the seat assembly base. Drive means are carried by the seat assembly base and interconnect the first and third seats for simultaneous movement relative to each other and to the second seat. The first and third seats move towards each other into the two-seat configuration wherein the first and third seats encroach upon the second seat and define a dead zone between the first and third seat. The first and third seats are moveable away from each other into the three-seat configuration wherein the second seat defines a center seat having the same seating width as the first and third seats.

According to one preferred embodiment of the invention, the first and second armrests are carried on the seat assembly base. The drive means interconnect the first and second armrests for simultaneous movement relative to each other and to the second seat. The first and second armrests are moveable towards each other into the two-seat configuration wherein the first and second armrests encroach upon the second seat and define respective, individual armrests for the first and third seats. The first and second armrests are moveable away from each other into the three-seat configuration wherein the first and second armrests define armrests shared by the first and second seats and the second and third seat, respectively.

According to another preferred embodiment of the invention, the drive means comprise a rack and pinion drive assembly.

According to yet another preferred embodiment of the invention, the rack and pinion drive assembly includes gear ratio means for moving the first and third seats at a rate different from the rate of movement of the first and second armrests.

According to a preferred embodiment of the invention in the two seat configuration, the seat assembly has a total length which is less than in the three-seat configuration and the first and third seats provide greater seating width than in the three-seat configuration.

According to a preferred embodiment of the invention in the three-seat configuration the seat assembly has a total length which is greater than in the two seat configuration and the first, second and third seat frames each provide equal seating width which is less than the seating width in the two seat configuration.

According to yet another preferred embodiment of the invention, the seat assembly includes first and second end bays positioned on opposite ends of the seat assembly frame, the first and second end bays interconnected to the drive means for movement therewith, and wherein movement of at least one of the end bays drives the drive means to move the seat assembly back and forth between the two seat and the three-seat configuration.

According to yet another preferred embodiment of the invention, the dead zone between the first and third seats is approximately one-half the seat width of the first or third seat.

According to yet another, alternative, preferred embodiment of the invention, the drive means are carried by the seat assembly base for moving at least one of the first and third seats for movement relative to said second seat, and may be constructed to move only one of the first or third seats, the other seat being moved manually.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
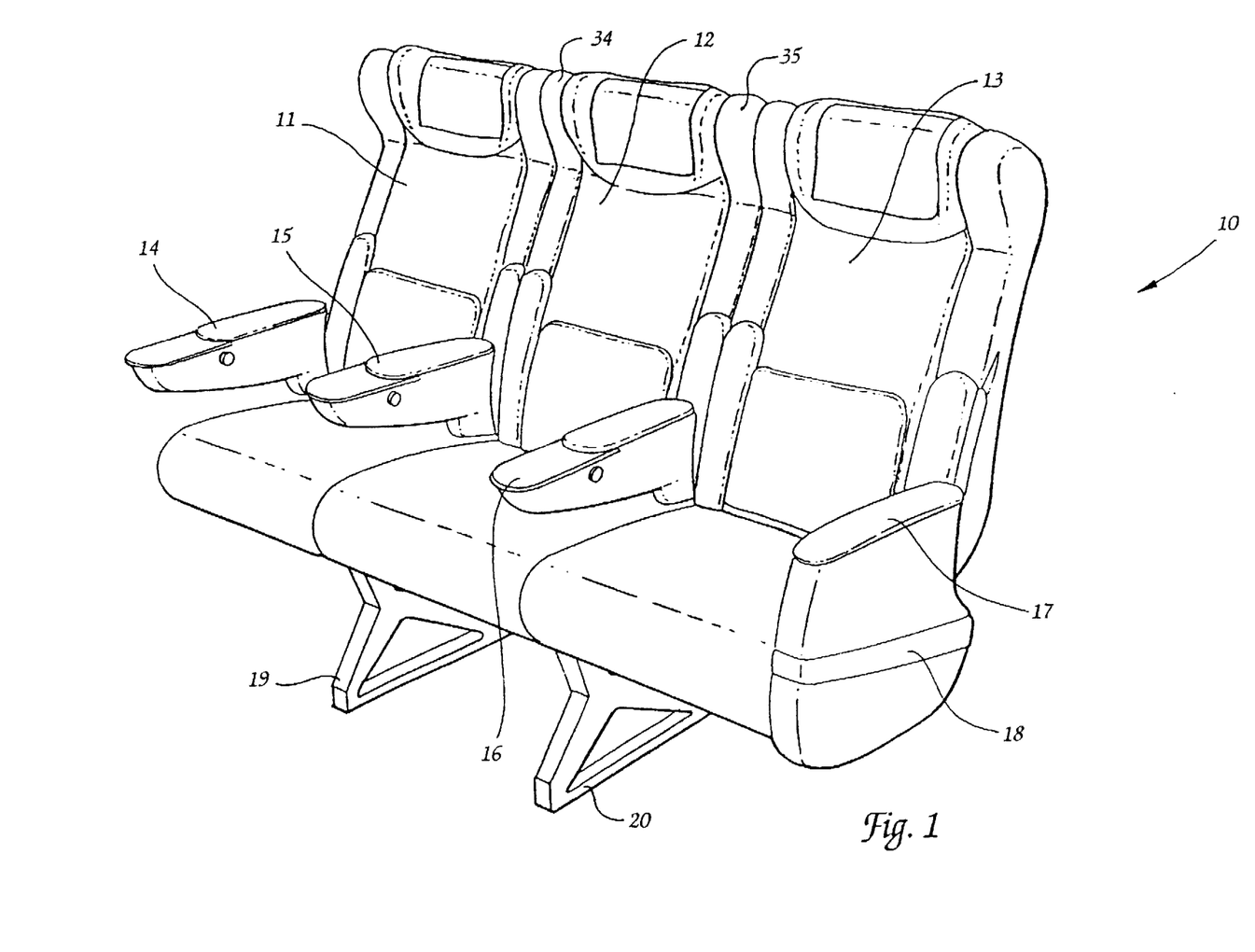
FIG. 1 is a perspective view of a passenger seat assembly in a three-seat economy configuration in accordance with an embodiment of the invention.

Referring now specifically to the drawings, a passenger seat assembly according to the present invention is illustrated in FIG. 1 and shown generally at reference numeral 10. The particular seat assembly shown in FIG. 1 is adapted for being positioned next to a window in the fuselage of the aircraft, and includes a window seat 11, center seat 12 and an aisle seat 13. In the economy configuration shown in FIG. 1, seat assembly 10 includes four armrests 14, 15, 16 and 17. Armrest 14 is positioned next to the window and armrest 17 with its full panel end bay 18 is positioned next to the aisle. Armrests 15 and 16 are shared by the three occupants.

The three seats 11, 12 and 13, and supporting frames, are mounted on legs 19 and 20 which are in turn locked into tracks (not shown) in the floor of the aircraft. When used in the center of an aircraft with aisles on both ends, both ends would have end bays such as end bay 18 in FIG. 1. Since the seat assembly 10 is otherwise identical, the seat assembly, whether used on the side or in the center of the aircraft will be referred to as "seat assembly 10".

Figure 2A:
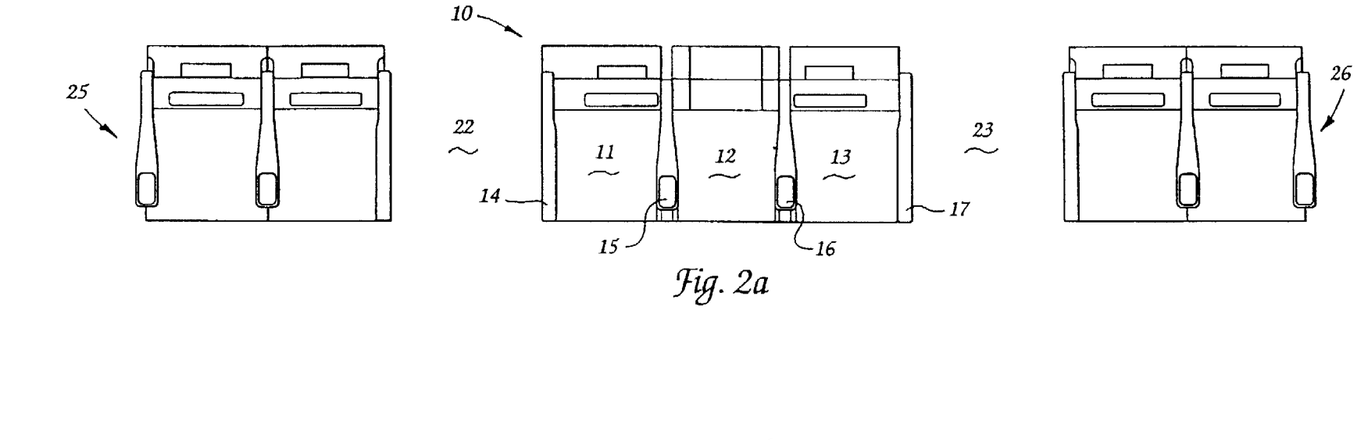
FIG. 2A is a schematic top plan view of a single row of seating assemblies in a passenger aircraft, the center seat assembly being in an economy configuration.
Figure 2B:
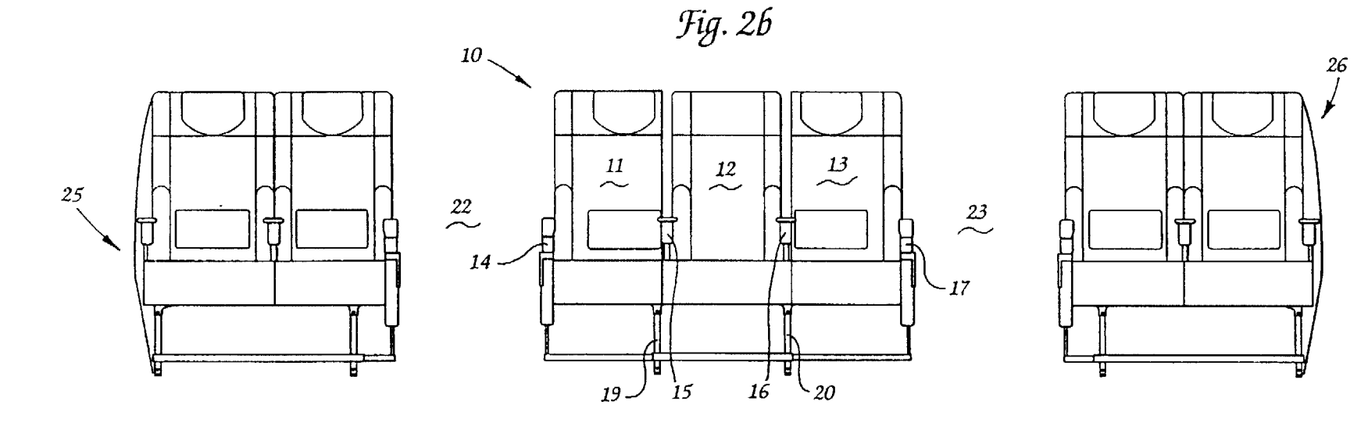
FIG. 2B is a schematic front elevation of the single row of seating assemblies in FIG. 2A.

Referring now to FIG. 2A and 2B, a complete row of seat assemblies is shown. In the configuration shown, seat assembly 10 is positioned in the center of the row separated by aisles 22 and 23, with seat assemblies 25 and 26—each with two seats—positioned on the port and starboard sides of the aircraft. By way of example only, the row is particularly configured for a Boeing 767 aircraft. FIGS. 2A and 2B show the economy configuration having a total of seven seats across the row from one side to the other.

In the 767 configuration shown in FIGS. 2A and 2B, each of the seat assemblies 25 and 26 are 42 inches wide and provide 18 inches of seat space between armrests. Aisles 22 and 23 are each 18.53 inches wide between armrests. While seats 25 and 26 are also convertible between configurations to provide more seat room, the method of conversion is different than that of the seat assembly 10 which is the subject of this application. Thus, while seats 25 and 26 will be generally referred to in their two configurations, the manner of making the conversion will not be further detailed in this application.

Seat assembly 10 according to this particular example in the three-seat configuration of FIGS. 2A and 2B is 62 inches wide, provides 18 inches of seat space between armrests, two inches of clearance between adjacent seat backs and four inches of clearance between adjacent seat bottoms at the outer end.

Figure 3A:
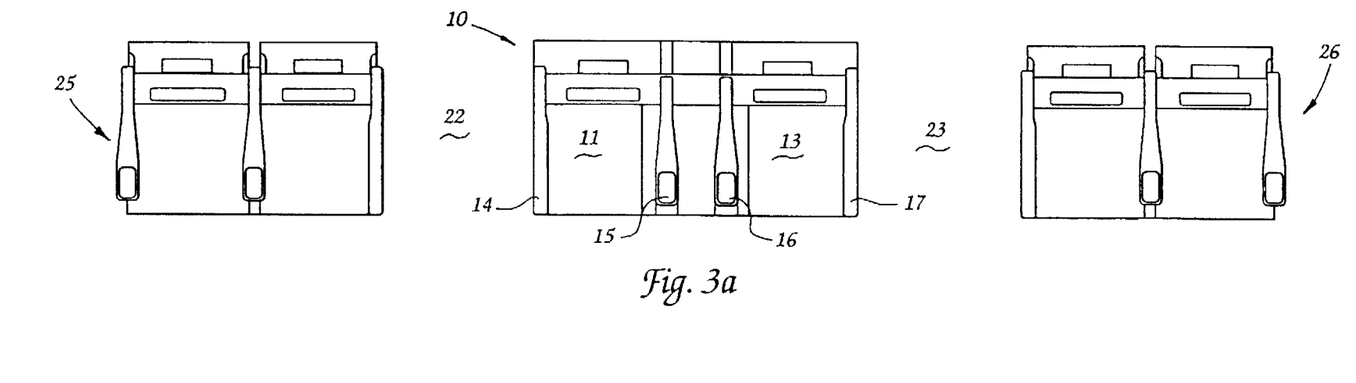
FIG. 3A is a schematic top plan view of a single row of seating assemblies in a passenger aircraft, the center seat assembly being in a two-seat configuration.
Figure 3B:
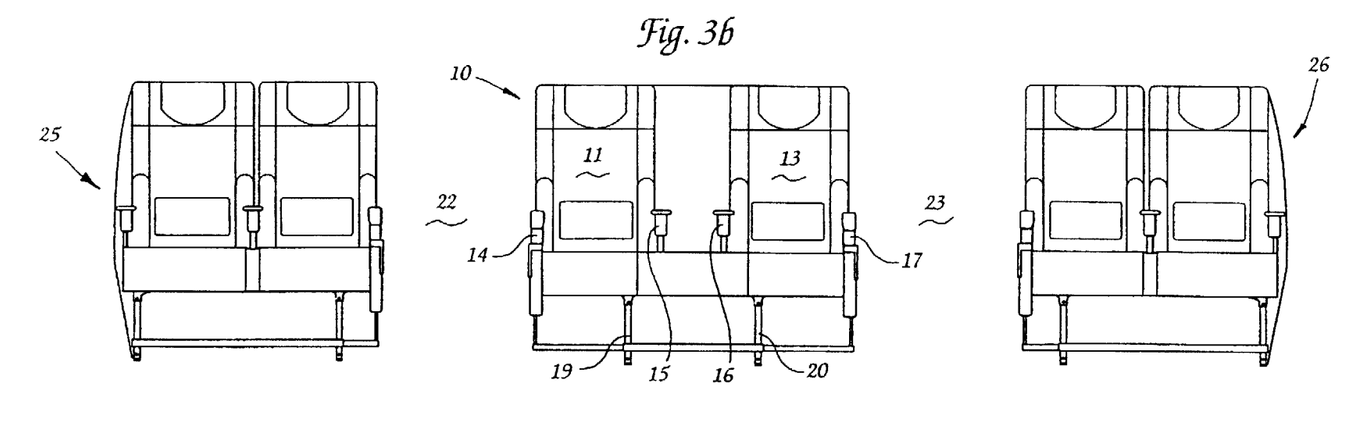
FIG. 3B is a schematic front elevation of the single row of seating assemblies in FIG. 3A.

When conversion from a three-seat to a two seat configuration is made, the purpose is to provide greater seat room and increased space between adjacent seats. Referring now to FIGS. 3A and 3B, a two seat configuration for seat assembly 10 such as would be used for a business class seating section is shown.

Seat assembly 10 according to this particular example in the two seat configuration is 54 inches wide, provides 19 inches of seat space between armrests 14 and 15 and 19 inches between armrests 16 and 17, 12 inches of clearance between adjacent seat backs and 14 inches of clearance between adjacent seat bottoms at the outer end. This 12 inch seat back clearance and 14 inch seat bottom clearance, previously part of seat 12, forms a "dead zone" between adjacent passengers, and also provides a separate armrest 15 or 16 for each of the two passengers. Thus, the overall width of the seat assembly 10 has been decreased from 62 to 54 inches. Seat assemblies 25 and 26 have been increased in overall width from 42 to 44 inches. The direct result of this conversion is to provide a seat width of 19 inches rather than 18 inches, and to provide four inches between adjacent seats. With seats 25 and 26 in this configuration and seat assembly 10 compressed to provide two larger seats 11 and 13, the row has been quickly converted from an economy to a business-class row. Conversion of the desired number of rows as described above provides a business-class cabin.

Figure 4:
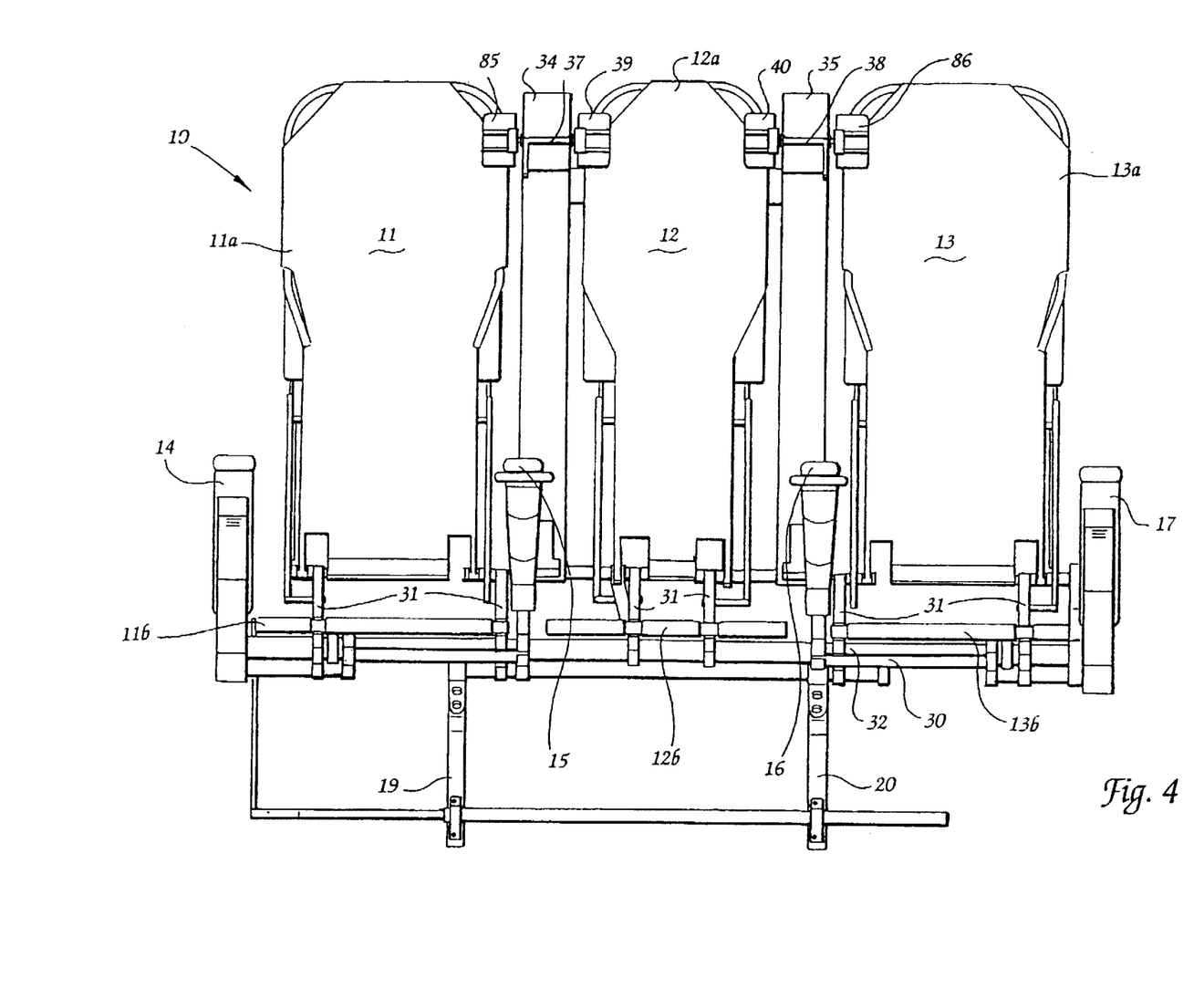
FIG. 4 is a front elevation of the seat frame of the seat assembly shown in FIGS. 2A and 2B.

Referring now to FIG. 4, a seat assembly 10 with cushions removed is shown and more specifically described. Seat backs 11A, 12A and 13A are mounted to a rear seat frame tube 30 by brackets 31, as are seat bottoms 11B, 12B and 13C. The front end of seat bottoms 11B, 12B and 13C are supported on a front seat frame tube 32.

Positioned between seat backs 11A and 12A, and 12A and 13A are auxiliary seat backs 34 and 35, respectively. In the three-seat configuration shown in FIGS. 1 and 4, the auxiliary seat backs 34 and 35 act as the seat back edges for the center seat 12, and are used by the occupant of the center seat 12. Note particularly in FIG. 1 that the auxiliary seat backs 34 and 35 are the same shape along their length as the adjacent sides of the seats 11 and 13, and are flush with the adjacent surfaces of seats 11 and 13.

Auxiliary seat backs 34 and 35 include respective locking bars 37 and 38 which cooperate with locking plates 39 and 40 on the upper outside edges of seat back 12A to hold the three structures together while in the three-seat configuration shown in FIG. 4.

Figure 5:
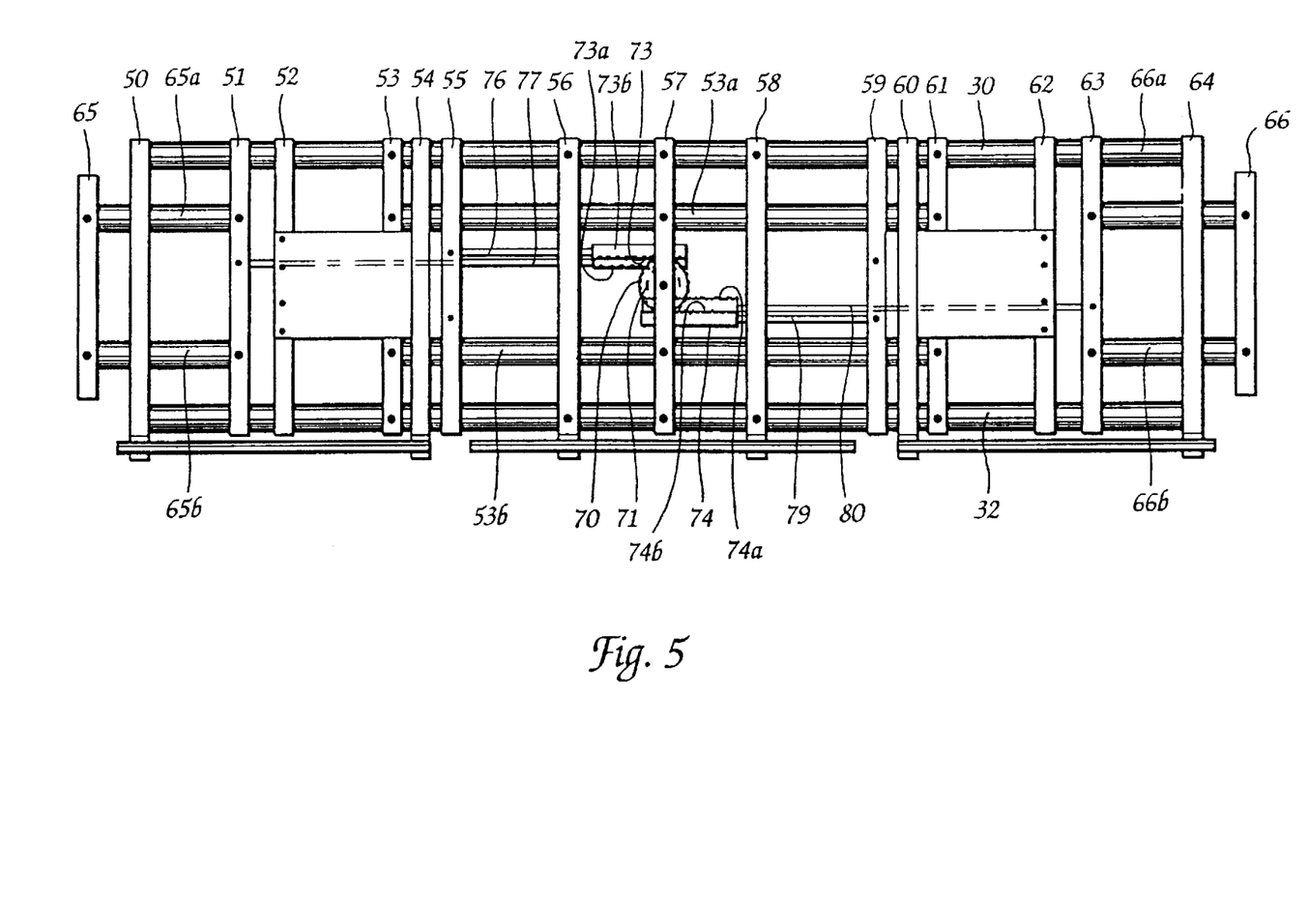
FIG. 5 is a simplified top plan view of the drive means of the seat assembly in the expanded, three-seat configuration.

Referring now to FIG. 5, the drive mechanism for moving the seat assembly 10 back and forth between the configurations shown in FIGS. 2A, 2B and 3A, 3B is shown. In the position shown in FIG. 5, the seat 10 is in the position shown in FIGS. 1, 2A, 2B and 4.

Front and rear seat frame tubes 32, 30 form major support structures for the drive mechanism, with brackets 50–64 extending between front and rear seat frame tubes 32, 30 to tie them together and to provide support for moving structures. Brackets 53, 56, 57, 58 and 61 are fixed on front and rear seat frame tubes 32, 30. Brackets 50, 51, 52, 54, 55, 59, 60, 62 and 63 include slide bearing rings by which they are mounted on the tubes 32, 30 and slide as the seat 10 movement takes place. Brackets 53 and 61 are interconnected by slide tubes 53A, 53B, which extend through holes in brackets 54, 55, 56, 57, 58, 59 and 60. The "dots" in the above-referenced brackets identify securing points wherein the identified brackets are immovably fixed to one or more of the tubes, as noted.

End bay support brackets 65 and 66 on opposite ends of the seat assembly are attached to the armrests 14 and 17.

Bracket 65 extends through holes in bracket 50 and connects to bracket 51 and moves therewith. Bracket 66 extends through holes in bracket 64 and connects to bracket 63 and moves therewith.

A pair of concentric pinion gears 70, 71 are mounted for rotation on a vertical axis on bracket 57. Gears 70 and 71 have a ratio of 5-to-4, meaning that rotation of gear 70 sufficient to create straight-line movement of 5 inches will cause sufficient rotation of gear 71 to create straight-line movement of 4 inches. A pair of racks 73 and 74 engage the teeth of gears 70 and 71. Rack 73 has two sets of rack teeth 73A, 73B which engage gears 71, 70, respectively. Rack 73 is attached to a pair of rack arms 76, 77. The other end of rack arm 76 is attached to bracket 55, on which armrest 15 is mounted. The other end of rack arm 77 is attached to bracket 51, which is connected by end bay slide tubes 65A, 65B to bracket 65 on which armrest 14 is mounted.

Rack 74 also has two sets of rack teeth—74A, 74B—which engage gears 71, 70, respectively. Rack 74 is attached to a pair of rack arms 79, 80. The other end of rack arm 79 is attached to bracket 59, on which armrest 16 is mounted. The other end of rack arm 80 is attached to bracket 63, which is connected by end bay slide tubes 66A, 66B to bracket 66 on which armrest 17 is mounted.

Figure 6:
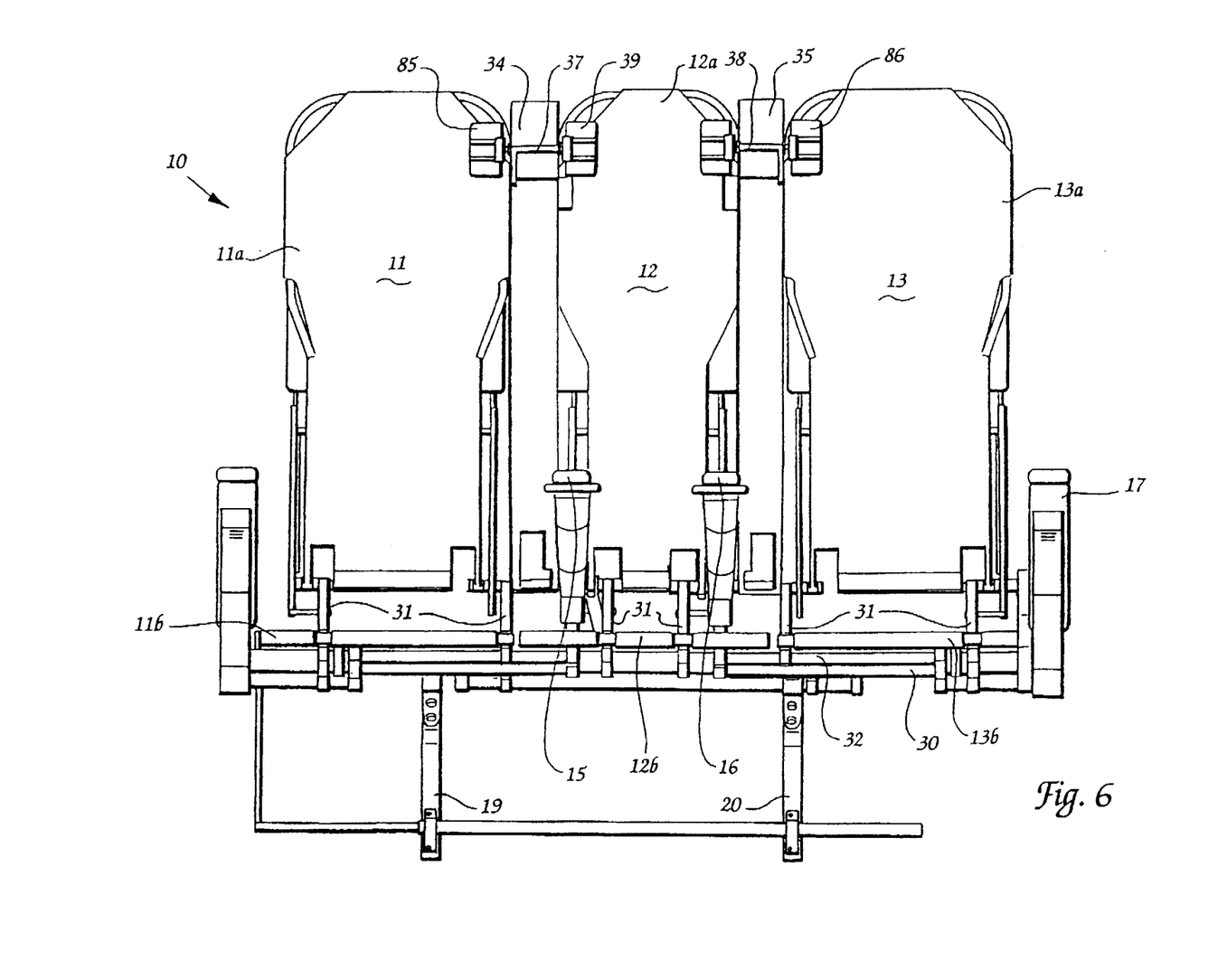
FIG. 6 is a front elevation of the seat frame of the seat assembly shown in FIGS. 3A and 3B.

Referring now to FIGS. 3A, 3B, and 6, seat assembly 10 in its two-seat configuration is shown. With particular reference to FIGS. 3A, 3B, note that the overall width of the seat assembly 10 is reduced eight inches—from 62 to 54 inches. This reduction takes place by a four inch inward movement of each of the opposite end bays with armrests 14 and 17. Also note that the inside armrests 15 and 16 are now eight inches apart instead of 18 inches apart, as in FIGS. 2A, 2B. This results from an inward movement of five inches inwardly of each of the armrests 15 and 16, or a total of ten inches. The four inch inward movement of the armrests 14 and 17 removes four inches from the seat width of each of the seats 11 and 13. The five inch inward movement of each of the armrests 15 and 16 adds five inches to the width of each of the seats 11 and 13. Thus, instead of the seats 11 and 13 providing 18 inches of seating width between the armrests 15 and 16, as in the three-seat configuration, a 19 inch seating with is provided. In addition, an eight inch "dead zone" is provided between armrests 15 and 16 to provide greater spacing between adjacent passengers.

The manner in which this translational movement of the seat assembly 10 takes place is described below:

Locking bars 37 and 38 are removed from locking plates 39 and 40, thus releasing auxiliary seat backs 34 and 35 from connection with the center seat 12. Locking bars 37 and 38 are then engaged with locking plates 85, 86 on the inner sides of seats 11 and 13, respectively to lock together the auxiliary seat 34 to seat 11 and the auxiliary seat 35 to seat 13. Then, either armrest 14 or 17 is pushed inwardly.

Figure 7:
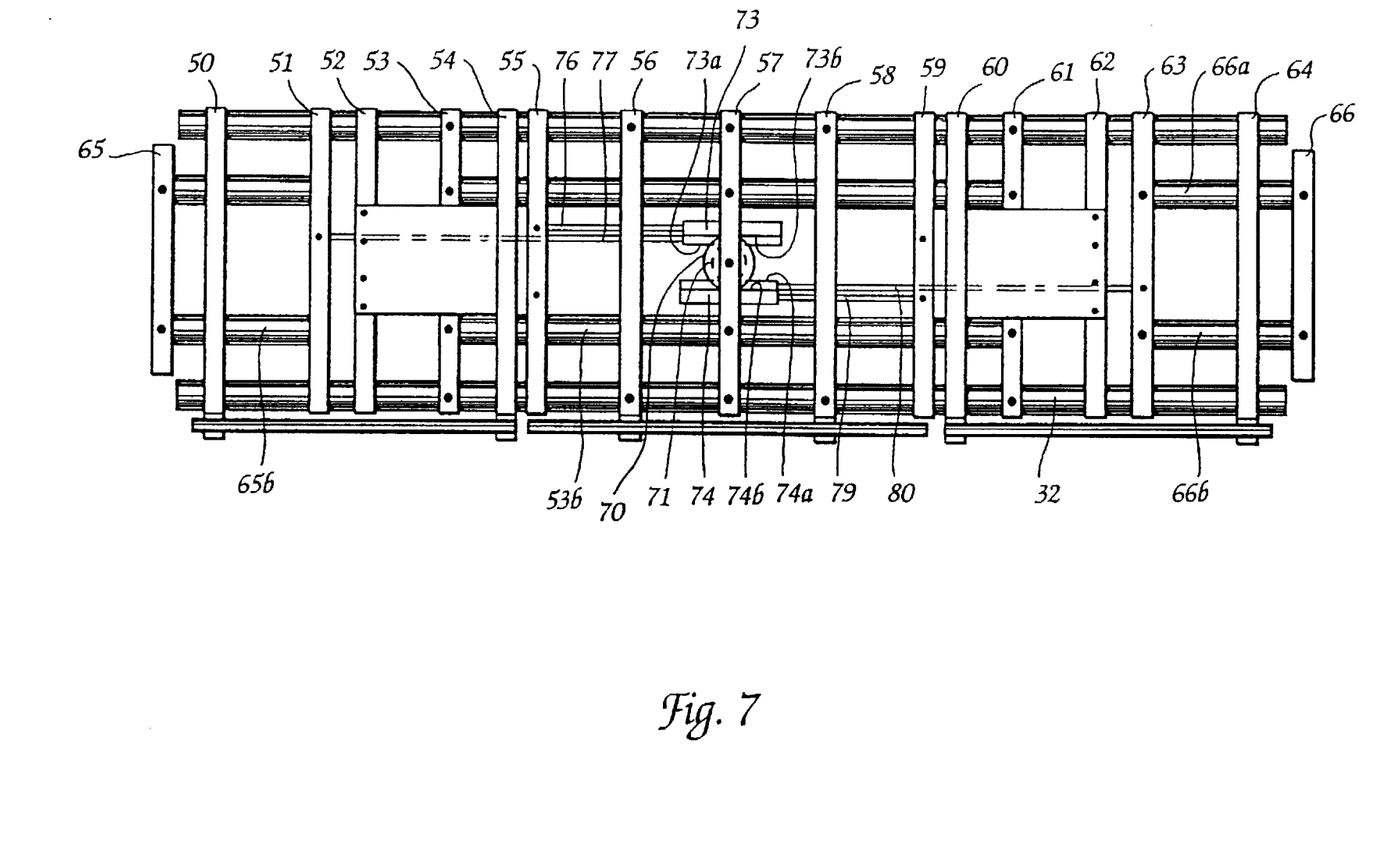
FIG. 7 is a simplified top plan view of the drive means of the seat assembly in the expanded, three-seat configuration.

Referring now to FIGS. 5 and 7, inward movement of the bracket 65 on which armrest 14 is mounted causes bracket 51 to slide along tubes 30 and 32. The rack arm 77 pushes rack 73 inwardly, and the rack teeth 73A drive gear 71 clockwise. Gear 70 is locked to gear 71 and rotates as well. Rotation of gear 70 drives rack teeth 73B and moves the rack arm 76 inwardly, as well. As described above, rotation of gear 71 sufficient to create four inches of straight-line movement causes a straight-line movement of five inches through gear 70, moving bracket 55 inwardly five inches.

Rotation of gears 70, 71 also drives rack 74, pulling brackets 63 and 66 inwardly four inches, and bracket 59 inwardly five inches. Since armrest 16 is mounted on bracket 59, it moves inwardly five inches. Armrest 17 is mounted on bracket 66 and thus moves inwardly four inches.

As is clear from the foregoing, either bracket 65 or 66 can be the driving or the driven end of the seat assembly 10, the movement of the gears 70, 71 transmitting the motion uniformly to both sides of the seat assembly 10.

Thus, as described above, the brackets 65, 66 and thus armrests 14 and 17 move inwardly four inches, while brackets 55 and 59 move armrests 15 and 16 inwardly five inches. The resulting seat configuration is shown in FIGS. 3A, 3B, 6 and 7.

In an alternative embodiment, the rack arm 80 is eliminated, so that the gear drive drive does not drive the seat 13 and the armrest 17. Rather, after operating the mechanism as described above, the end bay 18 is manually pushed inwardly to achieve the same results.

To return the seat assembly 10 to a three-seat configuration, the above procedure according to one or the other of the embodiments is carried out in reverse. Note that in addition to providing extra seating width and a dead zone between adjacent seats, the aisles are widened, thus providing greater spacing between adjacent aisle passengers, and increased room for movement along the aisles. The design described above provides a quick and simple seat conversion system. Telescoping tubes are not necessary, thus reducing unnecessary weight. The gear-drive connection provides a direct, positive, one-step motion which eliminates problems associated with configuration changes which require a number of consecutive movements which must be made in a fixed order. The effect of the armrest translation is to shift the seating inwardly slightly. The auxiliary seat backs 34 and 35, and corresponding portions of the seat bottoms become the innermost part of seats 11 and 13, while the outermost portions of seats 11 and 13 reside behind armrests 14 and 17, respectively.

A convertible passenger seat assembly is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A seat assembly convertible between multi-seat configurations, comprising:
   (a) a seat assembly base;
   (b) first and second outboard seats moveable on said seat assembly base, and defining a variable-width zone therebetween;
   (c) manually-actuated drive means carried by said seat assembly base and drivably interconnecting said first and second outboard seats for simultaneous movement of said outboard seats relative to each other, said first and second outboard seats being moveable:
   1. away from each other on said seat assembly base to increase the variable-width zone, thereby increasing the space for accommodating additional seats between the outboard seats; and
   2. towards each other on said seat assembly base to decrease the variable-width zone, thereby reducing the space for accommodating additional seats between the outboard seats.

2. A seat assembly according to claim 1, and including first and second sets of armrests carried on said seat assembly base adjacent to said first and second outboard seats, respectively, and said drive means interconnecting said first and second sets of armrests for simultaneous movement relative to each other, said first and second sets of armrests being moveable:

i. towards each other into a two-seat configuration wherein said first and second sets of armrests define respective individual armrests for said first and second outboard seats; and ii. away from each other into a three-seat configuration wherein said first and second sets of armrests define armrests shared by said first outboard seat and a middle seat located between said outboard seats and the middle seat and said second outboard seat, respectively.

3. A seat assembly according to claim 2, wherein said drive means comprises a rack and pinion drive assembly.

4. A seat assembly according to claim 3, wherein said rack and pinion drive assembly includes gear ratio means for moving said first and second outboard seats at a rate different from the rate of movement of the first and second sets of armrests.

5. A seat assembly according to claim 2, wherein in the two seat configuration:

(a) said seat assembly has a total length which is less than in the three-seat configuration; and (b) said first and second outboard seats provide greater seating width than in the three-seat configuration.

6. A seat assembly according to claim 2, wherein in the three-seat configuration:

(a) said seat assembly has a total length which is greater than in the two seat configuration; and (b) said first and second outboard seats and the middle seat each provide equal seating width which is less than the seating width in the two seat configuration.

7. A seat assembly according to claim 2, and including first and second end bays positioned on opposite ends of said seat assembly base, said first and second end bays being interconnected to said drive means for movement therewith, and wherein movement of at least one of said end bays drives the drive means to move the seat assembly back and forth between the two seat and the three-seat configuration.

8. A seat assembly according to claim 2, wherein the variable-width zone between said first and second outboard seats in the two-seat configuration is approximately one-half the seat width of said first or second outboard seat.

* * * * *